June 13, 1939.  C. W. SINCLAIR  2,161,904
BRAKE DRUM
Filed Aug. 3, 1931  3 Sheets-Sheet 1
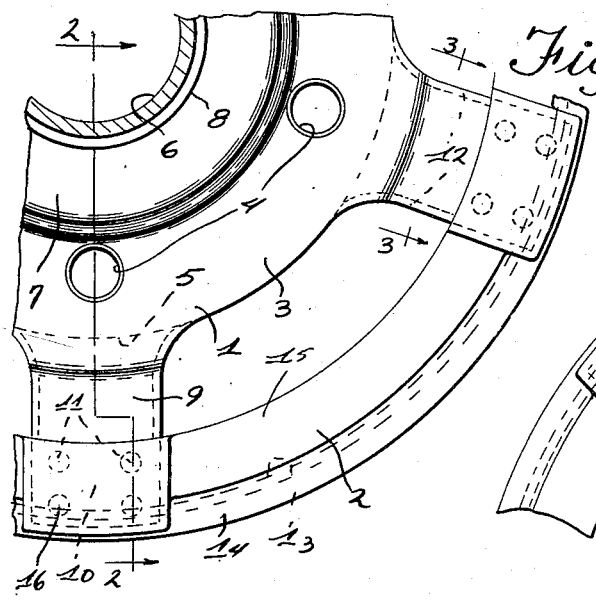
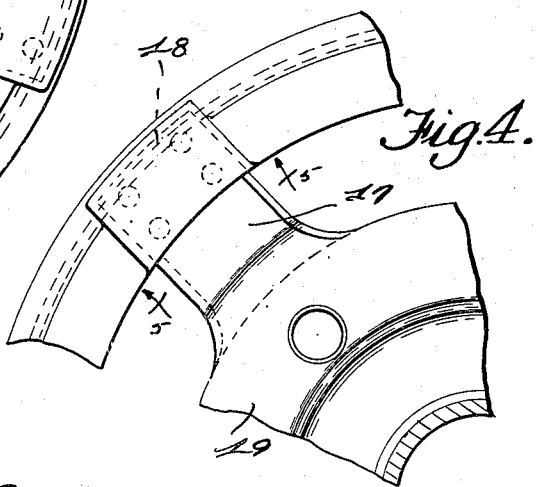
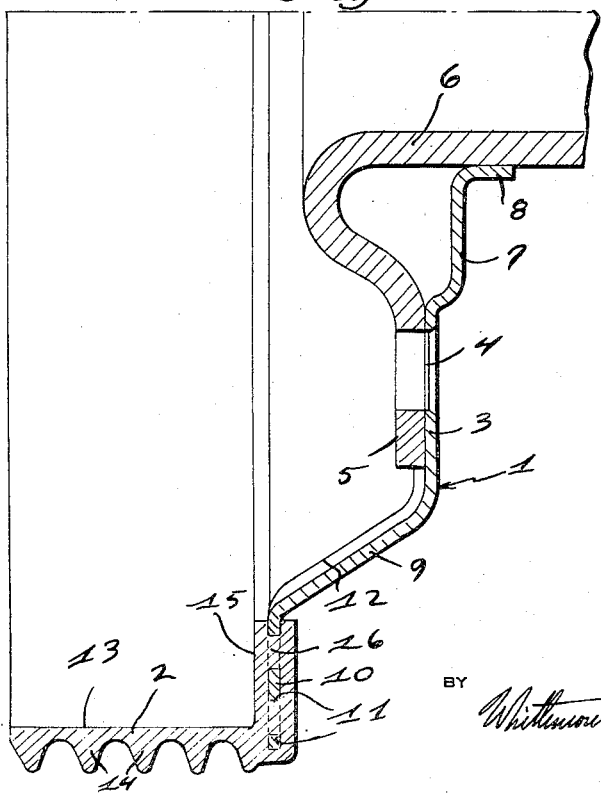
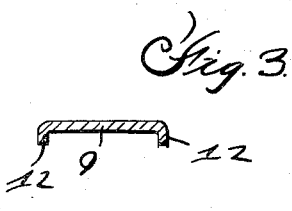
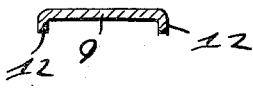
INVENTOR
Charles W. Sinclair
ATTORNEYS June 13, 1939.  C. W. SINCLAIR  2,161,904
BRAKE DRUM
Filed Aug. 3, 1931   3 Sheets-Sheet 2
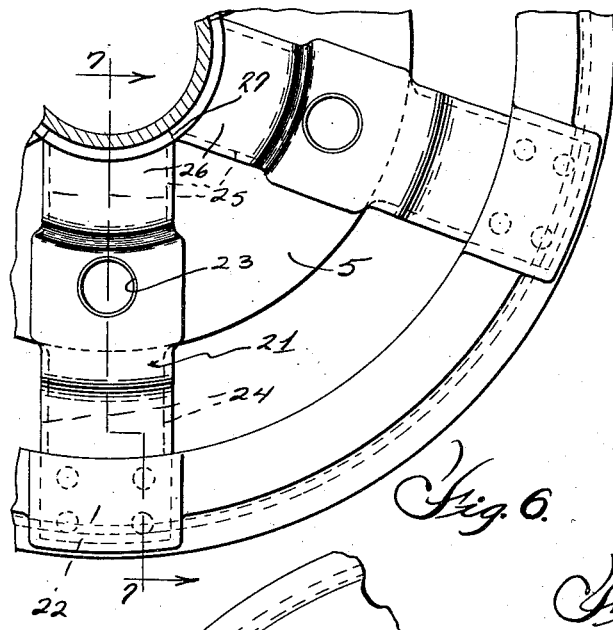
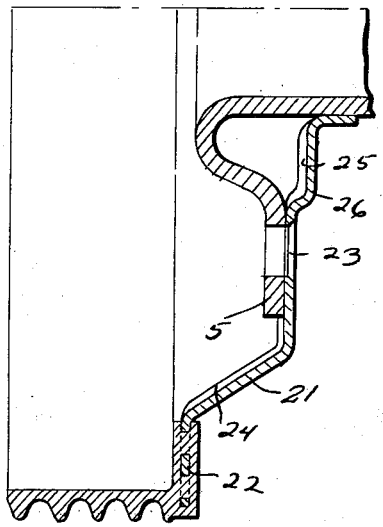
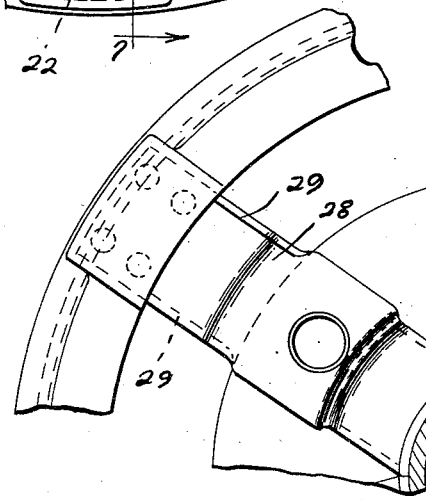
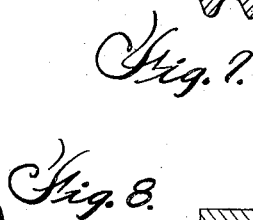
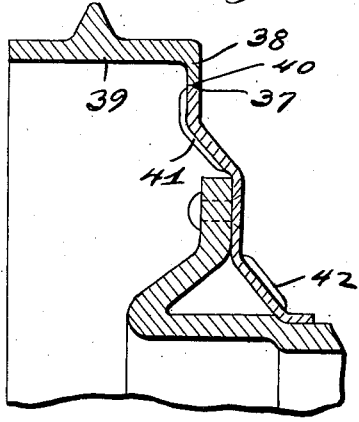
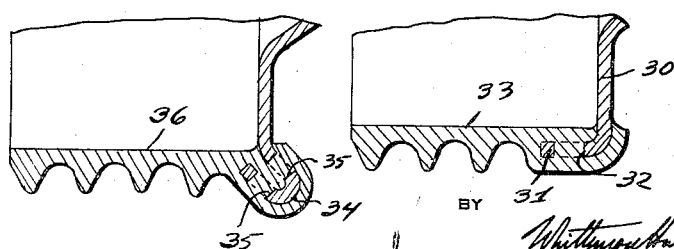
INVENTOR
Charles W. Sinclair
BY
Whittemore Hulbert Whittemore & Belknap
ATTORNEYS June 13, 1939.  C. W. SINCLAIR  2,161,904
BRAKE DRUM
Filed Aug. 3, 1931  3 Sheets-Sheet 3

INVENTOR
Charles W. Sinclair
BY Whittemore Hulbert & Whittemore Belknap
ATTORNEYS Patented June 13, 1939

2,161,904

UNITED STATES PATENT OFFICE 2,161,904

BRAKE DRUM

Charles W. Sinclair, Detroit, Mich., assignor, by mesne assignments, to The Kelsey-Hayes Wheel Company, Detroit, Mich., a corporation of Delaware Application August 3, 1931, Serial No. 554,810

9 Claims. (Cl. 188—218)

The invention relates to brake drums and has for an object to so construct a brake drum that it is efficient in operation and may be made at relatively low cost. Another object is to so construct a brake drum that its web and annular brake engaging member may be made of different materials and effectively secured together. Further objects are to so construct a brake drum and, more particularly, its web that it is strongly reinforced and to so construct the brake drum and, more particularly, its web that flow of air is secured through the brake drum upon rotation thereof.

These and other objects of the invention will become apparent from the following description, taken in connection with the accompanying drawings, in which:

Figure 1 is an elevation of a brake drum showing an embodiment of my invention;

Figures 2 and 3 are cross sections, respectively, on the lines 2—2 and 3—3 of Figure 1;

Figure 4 is a view similar to Figure 1 showing another embodiment of my invention;

Figure 5 is a cross section on the line 5—5 of Figure 4;

Figure 6 is a view similar to Figure 1 showing another embodiment of my invention;

Figure 7 is a cross section on the line 7—7 of Figure 6;

Figure 8 is a view similar to Figure 1, showing another embodiment of my invention;

Figures 9, 10 and 11 are views similar to Figure 2 showing other embodiments of my invention;

Figure 13:
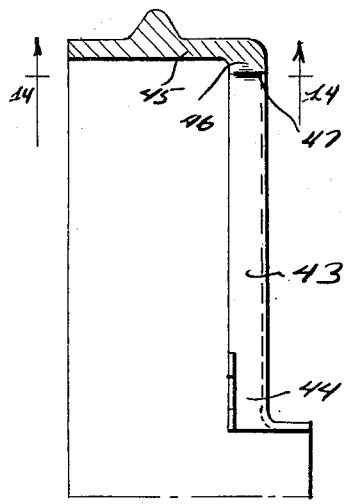
Figure 13 is a cross section on the line 13—13 of Figure 12.

The brake drum shown in Figures 1 and 2 comprises the spoked web 1 and the annular brake engaging member 2. The spoked web is preferably formed of sheet metal and has the annular portion 3 which is provided with the annular series of holes 4 for receiving suitable means, such as bolts, to secure the brake drum to the radially extending fixed flange 5 of the inner hub 6. The annular portion 3 is laterally offset forwardly or in a direction away from the flange 5 at 7 and has a central annular flange 8 which is adapted to sleeve over the barrel of the inner hub. The spoked web has the spoke portions 9 which radiate outwardly from the annular portion 3 and are preferably inclined outwardly and rearwardly therefrom and terminate in the radially extending anchoring portions 10, which are transversely apertured at 11. For the purpose of reinforcing the spoke portions, they are provided with the transverse rearwardly extending reinforcing flanges 12 at their edges and extending between the anchoring portions 10 and the annular portion 3 of the radial flange 5.

The anchoring portions 10 at the outer ends of the spoke portions form the peripheral anchoring portion for the spoked web to which is fixedly secured the annular brake engaging member 2. This member is provided with the radially inner brake engaging (or internal braking) surface 13 and with the ribs 14 on its radially outward (or external) surface and is cast upon the peripheral anchoring portion or, more specifically, the anchoring portions 10 at the outer ends of the spoke portions, it having the radially inwardly extending portion 15 embracing the anchoring portions and provided with integral portions 16 extending through the apertures 11.

The radially inwardly extending portion 15 of the brake engaging member is at one end of the brake engaging member and axially beyond the brake engaging or braking surface 13. Since the peripheral anchoring portion of the web extends generally radially and is completely embedded in the end portion including the radially inwardly extending portion of the brake engaging member, the anchoring portion is spaced from the brake engaging or braking surface to prevent chilling of the latter during the casting of the brake engaging member on the web. As a result, the brake engaging or braking surface may be readily machined and the weight of the brake engaging member consistent with the necessary strength to safely take care of the stresses to which it may be subjected in operation may be reduced. Also, since the anchoring portion of the web does not extend over the brake engaging or braking surface, the weight of the web may be reduced and furthermore the web does not interfere with the conduction of heat to the radially outer or external surface of the brake engaging member or radiation of heat from this surface.

In the modification shown in Figures 4 and 5 the parts have the same general arrangement as those shown in Figures 1, 2 and 3, with the exception that the spoke portions 17 are provided at their edges and between their outer anchoring portions 18 and the annular portion 19 of the spoked web with the reinforcing flanges 20, which extend in opposite directions or from opposite sides. These flanges 20 are preferably inclined and the arrangement is such that they serve to induce a flow of air through the brake drum upon rotation thereof to thereby assist in cooling the brake drum.

Figures 6 and 7 disclose another embodiment of my invention in which the web of the brake drum is made of the separately formed sheet metal spokes 21 which radiate from a common center. Each of these spokes has at its outer end the apertured anchoring portion 22 which is formed in the same manner as the anchoring portion 18 and has intermediate its ends the hole 23 which with the other holes of the other spokes forms an annular series of holes corrsponding to the holes 4. Furthermore, each spoke has the transverse reinforcing flanges 24 corresponding to the reinforcing flanges 12 and, in addition, has the transverse rearwardly extending reinforcing flanges 25 upon the offset inner portion 26 of the spoke and extending between the barrel and radial flange of the inner hub. The portions of the spokes between the flanges 24 and 25 and contacting with the inner hub flange 5 are flattened out and of greater width than the portions at either end thereof. To provide greater strength and rigidity the adjacent portions of the inner ends of the spokes are preferably welded together at 27.

In the modification shown in Figure 8, the spoked web is made of separately formed sheet metal spokes 28 in the same manner as shown in Figures 6 and 7, with the exception that each of the spokes 28 has the reinforcing flanges 29 extending in opposite driections and corresponding to the reinforcing flanges 20, shown in Figure 5, to effect a flow of air through the brake drum.

As shown in Figure 9, the spoked web 30 is provided with the transverse peripheral anchoring portion 31 which is formed by the transverse anchoring portions at the outer ends of the spoke portions. These anchoring portions 31 are apertured at 32 and the annular brake engaging member 33 is cast upon the anchoring portion and embraces the same and has integral portions extending through the apertures thereof.

Figure 10 discloses another modification in which the peripheral anchoring portion 34, which is formed by the anchoring portions at the outer ends of the spoke portions, is return bent and has its walls spaced from each other and apertured at 35. The annular brake engaging member 36 is cast upon this peripheral anchoring portion and embraces the same and has integral portions extending between the side walls and through the apertures of these side walls.

In the modification shown in Figure 11, the peripheral anchoring portion 37, which is formed by the anchoring portions at the outer ends of the spoke portions, is fixedly secured to the radially inwardly extending annular flange 38 of the brake engaging member 39 by welds 40. The web of the brake drum may be a spoked web, such as shown in Figures 1 or 4, but is preferably formed of spokes similar in construction to those of Figures 6 and 8, these spokes having the reinforcing flanges 41 and 42 with the flanges 41 preferably arranged to produce a flow of air through the brake drum.

Figure 12:
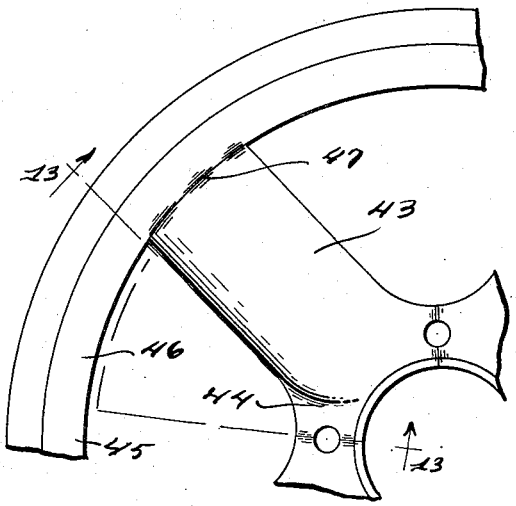
Figure 12 is a view similar to Figure 1, showing another embodiment of my invention.
Figure 14:
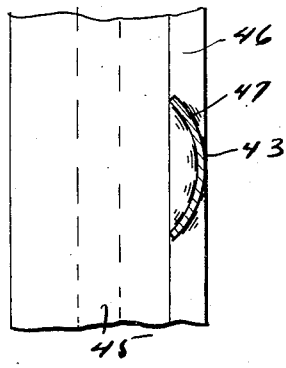
Figure 14 is a cross section on the line 14—14 of Figure 13.

In the construction shown in Figures 12, 13 and 14, the web of the brake drum is formed of sheet metal spokes 43, which are preferably U-shaped or semi-circular in cross section, and have the enlarged hub portions 44 at their inner ends which abut and are welded together. The annular brake engaging member 45 has the radially inwardly extending annular flange 46 which abuts and is welded to the outer ends of the spokes by the welds 47.

Figure 16:
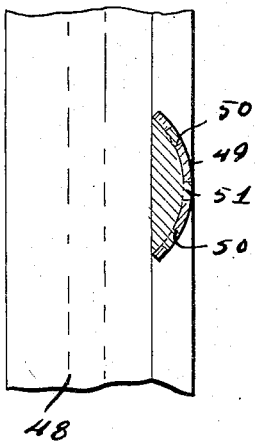
Figure 16 is a cross section on the line 16—16 of Figure 15.
Figure 15:
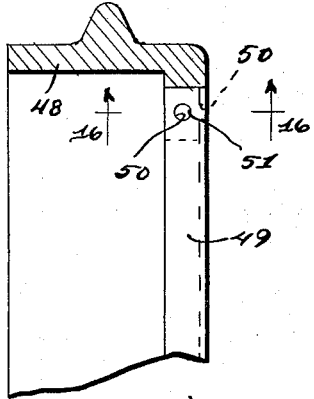
Figure 15 is a view similar to Figure 13, showing another embodiment of my invention.

Figures 15 and 16 disclose still another modification in which the annular brake engaging member 48 is cast upon the outer ends of the spokes 49, which latter are U-shaped or semicircular in section. These outer ends are preferably provided with the transverse openings 50 which are filled by the projections 51 integral with the portions of the brake engaging member extending within the outer ends of the spokes.

What I claim as my invention is:

1. A brake drum, comprising a web having spoke portions with oppositely extending transverse flanges projecting axially of the drum from the side edges of the spokes and anchoring portions at their outer ends, and an annular brake engaging member fixedly secured to said anchoring portions and caried by said web.

2. A brake drum, comprising radiating spokes having anchoring portions at their outer ends and oppositely extending transverse flanges projecting axially of the drum from the side edges of the spokes, and an annular brake engaging member fixedly secured to said anchoring portions and carried by said spokes.

3. A brake drum, comprising radiating sheet metal spokes having anchoring portions at their outer ends, certain of said spokes having holes intermediate their ends, an annular brake engaging member fixedly secured to said anchoring portions and having portions extending within the holes, said member being carried by said spokes, and means upon said spokes for creating a flow of air through the brake drum upon rotation thereof.

4. A brake drum, comprising radiating sheet metal spokes having anchoring portions at their outer ends, holes intermediate their ends, reinforcing flanges at their edges radially outwardly and inwardly of said holes, and an annular brake engaging member secured to said anchoring portions and extending transversely of and from one side of said spokes.

5. A brake drum comprising a sheet metal web having a generally radially extending peripheral anchoring portion and an annular cast brake engaging member having an exposed heat radiating external surface and an internal braking surface, said brake engaging member having an end portion axially beyond said braking surface completely embedding said peripheral anchoring portion.

6. A brake drum comprising a sheet metal web having a generally radially extending peripheral anchoring portion and an annular cast brake engaging member having an exposed heat radiating external surface and an internal braking surface, said brake engaging member having an end portion completely embedding said peripheral anchoring portion and spacing said web from said braking surface to prevent chilling of the latter.

7. A brake drum comprising a sheet metal web having a generally radially extending peripheral anchoring portion and an annular cast brake engaging member having an exposed heat radiating external surface and an internal braking surface, said brake engaging member having an end portion axially beyond said braking surface completely embedding said peripheral anchoring portion, said end portion including a radially inwardly extending portion of greater thickness than the minimum thickness of said brake engaging member.

8. A brake drum comprising a sheet metal web member having a generally radially extending peripheral anchoring portion formed with openings and an annular cast brake engaging member having an exposed heat radiating external surface and an internal braking surface, said brake engaging member having an end portion axially beyond said braking surface completely embedding said peripheral anchoring portion and extending through the openings thereof.

9. A brake drum comprising a sheet metal web member having a generally radially extending peripheral anchoring portion formed with openings and an annular cast brake engaging member having an exposed heat radiating external surface and an internal braking surface, said brake engaging member having an end portion comprising that portion axially beyond said braking surface and including that portion adjacent the zone of the axial extension of said braking surface completely embedding said peripheral anchoring portion and extending through the openings thereof.

CHARLES W. SINCLAIR.